Figures 1, 2, 3:
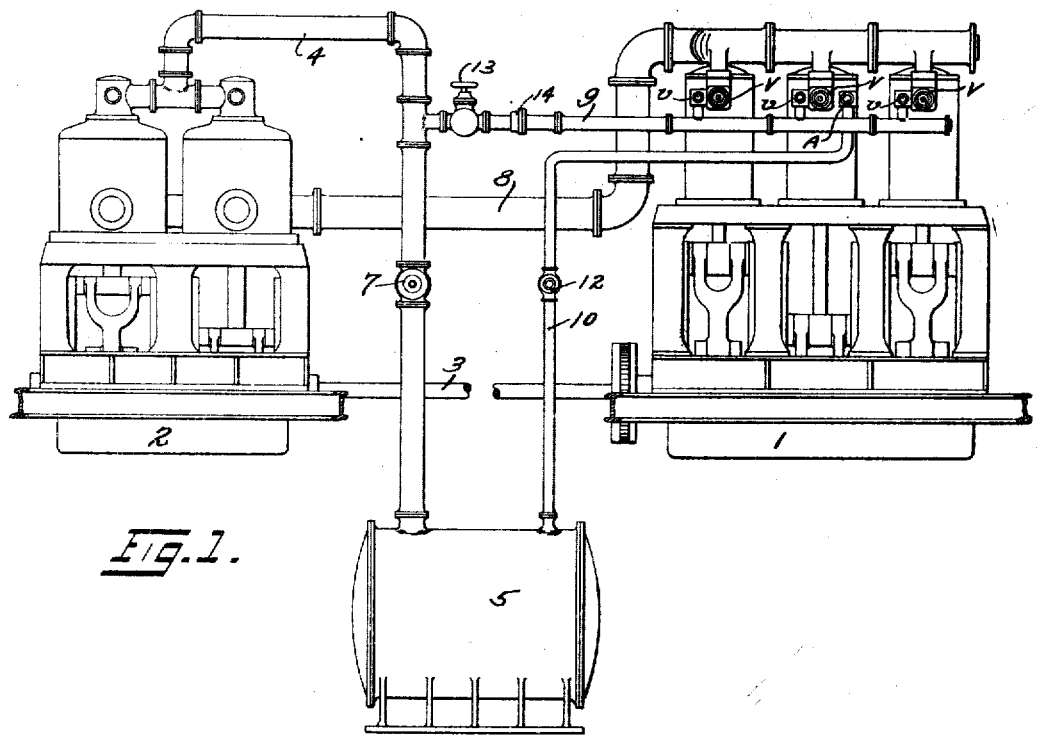

G. C. DAVISON.
SPRAY VALVE CONTROL FOR DIESEL ENGINES.
APPLICATION FILED APR. 13, 1916. RENEWED NOV. 16, 1918.

1,289,689.

Patented Dec. 31, 1918.

INVENTOR
G. C. Davison,
BY
ATTORNEYS.

UNITED STATES PATENT OFFICE.

GREGORY C. DAVISON, OF NEW LONDON, CONNECTICUT, ASSIGNOR TO ELECTRIC BOAT COMPANY, OF NEW YORK, N. Y., A CORPORATION OF NEW JERSEY.

SPRAY-VALVE CONTROL FOR DIESEL ENGINES

1,289,689.  Specification of Letters Patent.  Patented Dec. 31, 1918.

Application filed April 13, 1916, Serial No. 90,961. Renewed November 16, 1918. Serial No. 262,917.

*To all whom it may concern:*

Be it known that I, GREGORY C. DAVISON, a citizen of the United States, and a resident of New London, in the county of New London and State of Connecticut, have invented certain new and useful Improvements in Spray-Valve Controls for Diesel Engines; and I do hereby declare the following to be a full, clear, and exact description of the invention, such as will enable others skilled in the art to which it appertains to make and use the same.

This invention relates to the use of compressed air in heavy-oil internal combustion engines in connection preferably with means for storing compressed air whereby such air may be used conveniently either for spraying the oil fuel, for combination with such fuel for combustion purposes, or for starting the engine, and aims primarily to provide a novel and important process and apparatus for controlling variations of air pressure and for graduated fuel injection and combustion when the engine is started in operation.

In the accompanying drawings, which show the preferred form of apparatus for carrying out the invention, Figure 1 is a diagrammatic view showing a heavy-oil internal combustion engine, an air-compressor, a storage tank, and connected piping; and Figs. 2 and 3 are enlarged detail views of portions of the apparatus, Fig. 2 being a longitudinal section and Fig. 3 a transverse section on the line 3—3 of Fig. 2.

The reference numeral 1 indicates a heavy-oil internal combustion engine, the main-shaft 3 of which is connected to and drives an air compressor 2.

A main pipe line 4 leads from compressor 2 to a storage tank 5, and the flow of air through this line may be controlled by the valve 7 inserted therein. A second pipe 8 leads directly from the compressor 2 to the scavenger valves V of the engine 1. A branch pipe 9 from the pipe 4 leads to the spray valves v of the engine, and a pipe 10 leads from the tank 5 to an air-starting valve A associated with the starting cylinder of the engine. The pipe 10 has inserted therein a valve 12 and the pipe 9 has inserted therein a valve 13.

By means of the parts just described, the spray valves v may be supplied with air direct from the compressor 2 by opening the valve 13 and closing the valve 7 for long continued running on fuel. By opening both the valves 13 and 7, the spray valves v may be supplied with air from the storage tank 5 for emergency running on fuel. By closing the valves 7 and 13 and opening the valve 12, the engine may be run on compressed air from the storage tank 5 in starting.

Certain of the parts essential to the practice of the present invention are interposed in pipe 9 beyond valve 13 as indicated by the numeral 14 on Fig. 1.

It may be well to define the situation sought to be attained by the present process, in connection with the feeding of compressed air to the spray valves of a heavy-oil internal combustion engine, especially when such feeding is effected merely by opening an ordinary valve in the air line. Ordinarily, when it is desired during air-running to shift to fuel, there is either too great an initial surge of air to the valves v or else a prolonged feed at low pressure. The herein described process consists in causing the pressure of the injecting air at the place of mixture with the fuel to rise rapidly from a low value to a value slightly higher than the cylinder pressure, and to then rise at a lower rate to a pressure approximately double the cylinder pressure. This situation is believed to be the ideal one, particularly in view of actual results which have been obtained when it has been observed that the pressure-variations characteristic of the process have actually occurred at the nozzle of each spray valve. As the result of numerous tests and experiments, it has been demonstrated that upon carrying out the process in connection with an engine designed subject to a critical air pressure of 700 lbs., the term "critical" being here used to indicate the lowest pressure at which the spray valves will properly function, and subject to a maximum pressure or a pressure under which the spray valves will function most efficiently and economically during subsequent running, of 900 lbs., an apparatus similar to the very simple one hereinafter described actually maintains the air pressure at zero during the first infinitesimal fraction of time aforesaid, then causes a rapid rise of the air pressure to almost exactly 500 lbs. and thereafter, comparatively slowly raises the air pressure to the maximum or "good-working" pressure of 900 lbs. The pressure of the air, after the first rapid rise of said pressure, is lower than the critical pressure by the same number of pounds that the critical pressure is lower than the maximum pressure.

The peculiar value of the pressure variations just described will be further understood from the following explanation. Usually the compression pressure in a cylinder when fuel is first injected is approximately 450 lbs. When the initial spray pressure is approximately 900 lbs., which is as aforesaid the "running" pressure under which the spray valves will function most efficiently and economically, there is an expansion of the spray air down to 450 lbs. as such air enters the cylinder, and there results a chilling of the mixture in the vicinity of the spray nozzle, with the result that ignition is retarded on account of a lowering of the temperature below the burning point of the fuel. When, however, the engine is working on full load and up to speed, the ignition is not affected by the feeding of air at 900 lbs. pressure, since the heated condition of the cylinder overcomes the chilling tendency of the mixture as it expands upon injection into the cylinder.

If an instrumentality such as disclosed in Fig. 1 at 14 be interposed in the supply line of the spray valves of a heavy-oil engine, and if that instrumentality be interiorly constructed merely as shown in Figs. 2 and 3, the herein disclosed process may be carried out very advantageously and in full satisfaction of all the problems to be solved as above referred to. In Figs. 2 and 3, the instrumentality 14 is shown as including merely a length of pipe 15 and a length of pipe 16, both of a common internal diameter and arranged coaxially, in combination with a separating diaphragm 18, preferably very thin, which is provided with a centrally located aperture 19 of a diameter considerably smaller than the diameter last mentioned. Pipe-length 15 is provided with an annular flange adjacent to the diaphragm and a collar 14 is secured on pipe-length 15 adjacent to the diaphragm. Upon tightening the screws 17, the lengths 15 and 16 are drawn closely together and the diaphragm is clamped into rigidity accentuated, as is preferable, at the diaphragm's periphery.

When such a construction is incorporated in the organization of Fig. 1, compressed air is always fed precisely as above described to the spray valve $v$; merely opening the valve 13, never fails to cause a starting and graduated running of the engine on fuel. When the valve 13 is opened, in every case, the pressure of the air is for an infinitesimal period of time zero, then rises very rapidly and uniformly to a pressure value equal to approximately 50 per cent. of the maximum pressure-value, and then rises more slowly until it reaches the maximum. Such a control of the air pressure relatively of the spray valves gives remarkably high efficiency in every respect; as to absolute reliability, as to quickly attaining high speeds, and even as to economy of fuel.

I claim:

1. The method of starting on fuel a heavy-oil internal combustion engine in which the cylinder pressure during full load running on fuel is considerably less than the injecting air pressure, which consists in causing the pressure of the injecting air at the place of mixture with the fuel to automatically rise from a low value to a value slightly higher than the cylinder pressure, and to then rise at a lower rate from that pressure to a considerably higher pressure.

2. The method of starting on fuel a heavy-oil internal combustion engine in which the cylinder pressure during full load running on fuel is approximately one-half the injecting air pressure, which consists in causing the pressure of the injecting air at the place of mixture with the fuel to rise rapidly from a low value to a value slightly higher than the cylinder pressure, and to then rise at a lower rate to a pressure approximately double the cylinder pressure.

3. The method of starting on fuel a heavy-oil internal combustion engine in which the cylinder pressure during full load running on fuel is considerably less than the injecting air pressure, which consists in guiding a flow of air under said injecting pressure through and beyond an invariable and abruptly constricted opening, and thereafter mixing the air with the fuel supply to the engine.

4. In apparatus of the kind described, in combination, a source of compressed air supply, a conduit leading therefrom, an internal combustion engine, a spray-valve on the engine to which said conduit is connected, and an air-baffling means in the conduit always permitting the passage of air through and beyond the same but adapted to restrict thereat the initial flow of air through said conduit.

5. In apparatus of the kind described, in combination, a source of compressed air supply, a conduit leading therefrom, an internal combustion engine, a spray-valve on the engine to which said conduit is connected, and an air-baffling means in the conduit, provided with a permanently-open orifice of less cross-sectional area than the cross-sectional area of the interior of the conduit at opposite sides of the baffling means.

6. In apparatus of the kind described, in combination, a source of compressed air supply, a conduit leading therefrom, an internal combustion engine, a spray-valve on the engine to which said conduit is connected, and an air-baffling plate anchored transversely of the conduit and provided with a single permanently-open orifice of less cross-sectional area than the cross-sectional area of the interior of said conduit.

7. In apparatus of the kind described, in combination, a source of compressed air supply, a conduit leading therefrom, an internal combustion engine, a spray-valve on the engine to which said conduit is connected, and a thin air-baffling plate anchored transversely of the conduit and provided with a single permanently-open orifice of considerably less cross-sectional area than the cross-sectional area of the interior of said conduit.

8. In an apparatus of the kind described, the combination of an internal combustion engine, a spray-valve on the cylinder thereof, a source of supply of compressed air, a conduit extending from said source to the spray-valve, and a thin perforated plate arranged in the conduit for substantially reducing the cross-sectional area of the stream of air but always permitting the flow therethrough.

9. In apparatus of the kind described, the combination of an internal combustion engine, a source of supply of compressed air, a conduit leading from the source of supply to the interior of the cylinder, a valve device in the conduit for controlling the flow of air therethrough, and means in the conduit for substantially reducing the cross-sectional area of the stream of air but always permitting the flow therethrough.

In testimony whereof I affix my signature.

GREGORY C. DAVISON.